US010866896B2

(12) United States Patent
Rafacz et al.

(10) Patent No.: US 10,866,896 B2
(45) Date of Patent: Dec. 15, 2020

(54) APPARATUS AND METHOD FOR PREFETCHING ACCESS REQUEST ADDRESSES IN AN ADJACENT REGION OF MEMORY

(71) Applicant: ARM LIMITED, Cambridge (GB)

(72) Inventors: Todd Rafacz, Austin, TX (US); Huzefa Sanjeliwala, Austin, TX (US)

(73) Assignee: ARM Limited, Cambridge (GB)

( * ) Notice: Subject to any disclaimer, the term of this patent is extended or adjusted under 35 U.S.C. 154(b) by 1114 days.

(21) Appl. No.: 14/870,594

(22) Filed: Sep. 30, 2015

(65) Prior Publication Data

US 2017/0091104 A1    Mar. 30, 2017

(51) Int. Cl.
*G06F 12/08* (2016.01)
*G06F 12/0862* (2016.01)

(52) U.S. Cl.
CPC .. *G06F 12/0862* (2013.01); *G06F 2212/1016* (2013.01); *G06F 2212/1021* (2013.01); *G06F 2212/602* (2013.01); *G06F 2212/6024* (2013.01); *G06F 2212/6026* (2013.01)

(58) Field of Classification Search
CPC ........... G06F 12/0862; G06F 2212/602; G06F 2212/6026; G06F 2212/6024; G06F 2212/1021
See application file for complete search history.

(56) References Cited

U.S. PATENT DOCUMENTS

| | | | | |
|---|---|---|---|---|
| 6,678,795 B1 * | 1/2004 | Moreno | ............... | G06F 12/0862 711/137 |
| 7,975,108 B1 * | 7/2011 | Holscher | ............. | G06F 12/0862 711/118 |
| 8,775,741 B1 * | 7/2014 | de la Iglesia | ....... | G06F 12/0862 711/137 |
| 2006/0248280 A1 * | 11/2006 | Al-Sukhni | .............. | G06F 9/383 711/137 |
| 2006/0265552 A1 * | 11/2006 | Davis | .................. | G06F 12/0862 711/137 |
| 2010/0030973 A1 * | 2/2010 | Speight | ............... | G06F 12/0862 711/137 |
| 2010/0115206 A1 * | 5/2010 | de la Iglesia | ....... | G06F 12/0862 711/137 |

(Continued)

OTHER PUBLICATIONS

Merriam-Webster's Collegiate Dictionary 1345-46 (1993).*

*Primary Examiner* — Kevin Verbrugge
(74) *Attorney, Agent, or Firm* — Nixon & Vanderhye P.C.

(57) ABSTRACT

Prefetch apparatus and a method of prefetching are presented. The prefetch apparatus monitors access requests, each having an access request address, and has request tracking storage to store region entries for regions of memory space which each span multiple access request addresses. The request tracking storage keeps access information for access requests received in their corresponding region entries. When a new region access request is received, which belongs to a new region for which there is no region entry, and when the request tracking storage has an adjacent region entry for which the access information shows that at least a predetermined number of the access request addresses have been accessed, a page mode region prefetching process is initiated for all access request addresses in the new region.

18 Claims, 5 Drawing Sheets

(56) References Cited

U.S. PATENT DOCUMENTS

| | | | | |
|---|---|---|---|---|
| 2011/0238920 A1* | 9/2011 | Hooker | G06F | 12/0862 |
| | | | | 711/136 |
| 2011/0238922 A1* | 9/2011 | Hooker | G06F | 12/0862 |
| | | | | 711/137 |
| 2012/0054449 A1* | 3/2012 | Hu | G06F | 12/0862 |
| | | | | 711/137 |
| 2013/0339617 A1* | 12/2013 | Averbouch | G06F | 12/0862 |
| | | | | 711/133 |
| 2013/0346703 A1* | 12/2013 | McCauley | G06F | 12/0862 |
| | | | | 711/137 |
| 2015/0121014 A1* | 4/2015 | Dasika | G06F | 12/0862 |
| | | | | 711/137 |
| 2015/0356014 A1* | 12/2015 | Sathish | G06F | 12/0862 |
| | | | | 711/3 |
| 2016/0110194 A1* | 4/2016 | Hooker | G06F | 12/0831 |
| | | | | 712/207 |

* cited by examiner

APPARATUS AND METHOD FOR PREFETCHING ACCESS REQUEST ADDRESSES IN AN ADJACENT REGION OF MEMORY

TECHNICAL FIELD

The present disclosure relates to data processing. More particularly, it relates to prefetching in a data processing apparatus.

BACKGROUND

In a data processing apparatus which performs data processing operations using data items (whether instructions or data) retrieved from a memory, the data processing apparatus may be provided with prefetching capability according to which data items can be retrieved from the memory before a request for the data item has been received. For example, where a central processing unit (CPU) issues memory access requests which comprise load requests, prefetching circuitry can monitor these load requests and, by identifying certain patterns in the load requests, can generate prefetch requests which retrieve data items from memory which are predicted to be required on the basis of the pattern observed. Further, in such an example, where the prefetching circuitry of the data processing apparatus is configured to identify a certain stride length in the memory addresses of the load requests which it receives, it may generate prefetch requests for further load requests which have not yet been received, but are expected on the basis of an extrapolation of that stride pattern of load requests. As a result, when such load requests are received, then a local data storage component, such as a cache, may already be populated with the required data item, thus reducing the latency associated with the retrieval of this data item from memory in response to a corresponding load request.

SUMMARY

At least one embodiment provides prefetch apparatus comprising: access request reception circuitry to receive access requests, each access request having an access request address; request tracking storage to store a plurality of region entries, wherein each region entry corresponds to a region of memory space and corresponds to a plurality of access request addresses within that region of memory space, and wherein the request tracking storage is responsive to reception of each access request to update access information in its corresponding region entry; and prefetch control circuitry responsive to the access request reception circuitry receiving a new region access request which belongs to a new region for which there is no region entry, and when the request tracking storage has an adjacent region entry corresponding to an adjacent region of memory space to the new region for which the access information indicates that at least a predetermined number of the access request addresses in the adjacent region of memory space have been accessed, to initiate a region prefetching process for all access request addresses in the new region.

At least one embodiment provides a method of issuing prefetch requests in a prefetch apparatus comprising: receiving access requests, each access request having an access request address; storing a plurality of region entries in request tracking storage, wherein each region entry corresponds to a region of memory space and corresponds to a plurality of access request addresses within that region of memory space; updating access information in a corresponding region entry for each access request received; and initiating a region prefetching process for all access request addresses in the new region in response to receiving the new region access request, when the request tracking storage has an adjacent region entry corresponding to an adjacent region of memory space to the new region for which the access information indicates that at least a predetermined number of the access request addresses in the adjacent region of memory space have been accessed.

At least one embodiment provides prefetch apparatus comprising: means for receiving access requests, each access request having an access request address; means for storing a plurality of region entries, wherein each region entry corresponds to a region of memory space and corresponds to a plurality of access request addresses within that region of memory space; means for updating access information in a corresponding region entry for each access request received; and means for initiating a region prefetching process for all access request addresses in the new region in response to receiving the new region access request, when the means for storing the plurality of region entries has an adjacent region entry corresponding to an adjacent region of memory space to the new region for which the access information indicates that at least a predetermined number of the access request addresses in the adjacent region of memory space have been accessed.

BRIEF DESCRIPTION OF THE DRAWINGS

The present techniques will be described further, by way of example only, with reference to embodiments thereof as illustrated in the accompanying drawings, in which.

DESCRIPTION OF EXAMPLE EMBODIMENTS

At least some embodiments provide prefetch apparatus comprising: access request reception circuitry to receive access requests, each access request having an access request address; request tracking storage to store a plurality of region entries, wherein each region entry corresponds to a region of memory space and corresponds to a plurality of access request addresses within that region of memory space, wherein the request tracking storage is responsive to reception of a new region access request which belongs to a new region for which there is no region entry to create a new region entry for that new region, and wherein the request tracking storage is responsive to reception of each access request to update access information in its corresponding region entry; and prefetch control circuitry responsive to the access request reception circuitry receiving the new region access request, and when the request tracking storage has an adjacent region entry corresponding to an adjacent region of memory space to the new region for which the access information indicates that at least a predetermined number of the access request addresses in the adjacent region of memory space have been accessed, to initiate a region prefetching process for all access request addresses in the new region.

The present techniques recognise that there are access patterns of access requests which may be received by a prefetch apparatus which may be difficult for pattern recognition techniques within the prefetch apparatus to identify. This may occur for a number of different reasons. On the one hand, it may be the case that the pattern of access requests received corresponds to a pattern which is complex and providing the prefetch apparatus with the capability to recognise a pattern of this complexity and generate appropriate prefetch requests to extrapolate that pattern is simply prohibitively expensive. It may however be the case that the programmed order in which a set of memory addresses is accessed corresponds to a relatively simple pattern, indeed perhaps as simple as sequential memory addresses, yet the order in which access requests are received by the prefetch apparatus may be somewhat different, due to out of order issue or compiler optimisations that rearrange the access patterns. In this context, the present techniques categorises the memory space accessed by the access requests it receives into a plurality of regions, wherein a region is a contiguous block of memory consisting of a plurality of memory addresses. These regions may be defined in terms of individual memory addresses at a finer level of granularity, or for example in terms of cache lines (each comprising a number of memory addresses) each defined by a corresponding starting memory address. The prefetch apparatus is provided with tracking capability with respect to the access requests it receives in the form of request tracking storage in which it stores a plurality of region entries, wherein each region entry in the request tracking storage corresponds to a defined "region" of memory as it is defined in the system. Accordingly, one region entry in the request tracking storage then corresponds to a number of access request addresses. When a new region access request is received, i.e. an access request corresponding to a defined region for which there is no entry in the request tracking storage, the present techniques provide that the prefetch control circuitry determines if the request tracking storage already has another region entry corresponding to another region which is adjacent to (i.e. contiguous with) the new region for the new access request. The prefetch control circuitry then uses the access information stored in association with such a region entry to determine if at least a predetermined number of the access request addresses in that adjacent region of memory space have been accessed. In other words, a threshold is defined for the number of access request addresses accessed within a region and the prefetch control circuitry determines if this threshold is exceeded. If such an adjacent region does exist, and if this threshold has been exceeded for that region, then the prefetch control circuitry initiates a region prefetching process for all access request addresses in the new region. Thus, where the prefetch control circuitry determines that a sufficient number of the access request addresses in the adjacent region have already been accessed, it is considered that there is a good likelihood that a high proportion of the access request addresses in the new region will also be accessed and it has been found to be beneficial to implement a mechanism according to which all access request addresses in the new region are prefetched, this also being referred to herein as a "page mode" prefetch. Thus, even if the pattern of the addresses of recently received access requests is rather complex, whether because of the underlying manner in which the program code being executed seeks to access particular memory locations or because a simpler pattern of memory location access in the underlying code has been made more complex and/or difficult to recognise (for example because of compiler optimisations or out of order issue), the present techniques can nonetheless derive benefit from identifying that overall a significant proportion of memory locations within one region of memory space being accessed represents a good opportunity to prefetch the entirety of an adjacent memory region, since the underlying pattern is expected to continue and thus the provision of such a prefetch apparatus can reduce the latency associated with fulfilling the received access requests. It should be appreciated that the present techniques envisage that the access requests are load requests, store requests, or a combination of the two.

The request tracking storage may be provided in a variety of ways, but will have finite storage capacity, and in particular may not have storage capacity to store region entries corresponding to all regions defined for the memory space. Accordingly, it may be configured to operate in a cache-like manner in which an existing region entry is evicted from the request tracking storage when a new region entry is allocated into the request tracking storage and in response to a new access request that has been received. Hence in some embodiments the request tracking storage is responsive to reception of the new region access request which belongs to the new region for which there is no region entry to create a new region entry for the new region. Given that this is a new region entry, in such embodiments this allocation into the request tracking storage can then be the trigger for the prefetch control circuitry to perform its check for an adjacent region entry which is above the access threshold to trigger the page mode prefetch for the new region.

The access information stored in association with each region entry, and by means of which the prefetch apparatus can determine if the predetermined number of access request addresses has been reached (i.e. the threshold has been crossed) may take a variety of forms, but in one embodiment the access information in each region entry comprises a plurality of access indications corresponding to the plurality of access requests whose access request addresses are within that region of memory space, and wherein the request tracking storage is responsive to reception of each access request to set an access indication corresponding to the access request address of that access request. Thus the request tracking storage can have the capability with respect to each access request address that it receives to set an access indication (e.g. a marker, a particular bit value, etc.) indicating that this access request address within the region has been accessed. The determination of whether the predetermined number of access request addresses in a given region has been accessed can then be made with respect to these access indications, for example by counting the number of set access indications within a region to determine if this has reached the predetermined number.

The access information may be stored in other ways (as an alternative, or in addition) and in some embodiments the plurality of region entries each comprise a counter and the access information in each region entry comprises a count value of the counter. Thus, when an access request address is received in association with an access request the counter for the region to which that access request address belongs is incremented to indicate that an access request address within this region has been accessed. The definition of the predetermined number may then be made with reference to a given counter value when the counter is examined.

When the prefetch control circuitry determines that there is an adjacent region whose set of access request addresses have been sufficiently fully accessed (i.e. the number of access request addresses within that region which have been accessed is at least the predetermined number) then the prefetch control circuitry may take into account whether this adjacent region is lower than, or higher than, the new region when initiating the region prefetching process (switching to "page mode" prefetch). Accordingly, in some embodiments the prefetch control circuitry is responsive to the adjacent region of memory space being below the new region to cause the region prefetching process to prefetch the access request addresses in the new region in ascending order. Thus, where the adjacent region of memory space is lower than the new region of memory space it is assumed that the memory addresses are being accessed in an ascending order and the region prefetching process can then continue that ascending order by initiating prefetch requests for the access requests in the new region in a continuing ascending order. By contrast, where the prefetch control circuitry determines that the adjacent region of memory space is above the new region, it might be assumed that the memory addresses are being accessed in a descending order and thus in some embodiments the prefetch control circuitry is responsive to the adjacent region of memory space being above the new region to cause the region prefetching process to prefetch the access request addresses in the new region in descending order.

The access request addresses which are received by the access request reception circuitry may be defined in a variety of ways, whether being full (explicit) memory addresses, or being subdivided into component parts (in the manner in which addresses may for example be handled in cache circuitry), and in some embodiments the access request address received by the access request reception circuitry is specified as a region tag and an offset in an offset range, and the prefetch control circuitry is responsive to the offset being in a lower half of the offset range to examine the access information in the adjacent region of memory space below the access request address and is responsive to the offset being in a upper half of the offset range to examine the access information in the adjacent region of memory space above the access request address. The prefetch control circuitry can therefore simplify the examination of neighbouring entries in the request tracking storage by only examining an adjacent region on one side of the new region (either above or below depending on whether the offset is in the lower or upper half of the offset range), since the assumption may be made that if the address (offset) is in the lower half of the region that the memory access requests are incrementing within the new region and if it is in the upper half of the new region they are decrementing. The comparison against region entries and the existing tracking storage can therefore be simplified. Moreover within the offset range only a single bit may need to be examined in order to determine which half of the region an address is in, thus providing an efficient determination.

As mentioned above, the access request received may relate to individual memory addresses, or may relate to groups of memory addresses, such as is the case in terms of prefetch apparatus associated with a cache storage device, where cache lines comprising several memory addresses are retrieved from memory. Accordingly, in some embodiments the access requests are cache line requests and each region entry corresponds to a plurality of cache line requests. For example, where a cache line corresponds to 64 bytes, a region may be defined as 16 cache lines and thus corresponds to 1 kB of memory space. The predetermined number of access request addresses then corresponds to a predetermined number of cache lines being accessed within this region and if that threshold of accessed cache lines is reached in an adjacent region to a new region being allocated, then the page mode prefetching will be enabled for the new region, issuing prefetch requests for the new region on this cache line basis.

When the prefetch control circuitry initiates the region prefetching process this may be done in a variety of ways. For example, although the ultimate aim of the region prefetching process is that all access request addresses in the new region should be prefetched, prefetch requests for all of these access request addresses may not be generated straight away. For example, in one embodiment the region prefetching process comprises sequentially issuing plural prefetch requests for subgroups of access request addresses in the new region. This may for example be beneficial in the context of a prefetch apparatus associated with a storage device with relatively limited storage capacity, such as a cache memory which is provided in close association with a data processing apparatus (e.g. a level one cache). Accordingly, in some embodiments the region prefetching process comprises sequentially issuing plural prefetch requests for subgroups of access request addresses in the new region. These subgroups could indeed comprise only single access request addresses, or groups of such access request addresses.

There may however be configurations in which a storage device with which the prefetch apparatus is associated may have a greater storage capacity and therefore is better able to receive and hold a larger number of prefetched data in advance of that data item being required. Accordingly in some embodiments the region prefetching process comprises issuing prefetch requests as a group for all access request addresses in the new region. This may for example be appropriate in the context of a cache storage device which is higher in a cache memory hierarchy, such as at level two, where (in dependence on the definition of the size of the regions) it may have capability to store data items for an entire region without this being expected to disrupt its ongoing storage of other data items. Prefetch requests for the whole region may then be generated.

The present techniques recognise that it may be beneficial for the prefetch apparatus to combine the above-described "page mode" technique with another prefetch algorithm. In doing so, the advantages of both techniques/algorithms may be gained and indeed a complementary algorithm may be used, such that synergistic benefit is achieved. For example, in one embodiment the prefetch apparatus further comprises a prefetch pattern storage to store indications of previously received access requests and the prefetch control circuitry is responsive to the indications of previously received access requests in the prefetch pattern storage corresponding to a predetermined pattern of access requests to perform an extrapolation of the indications of previously received access requests in the prefetch pattern storage and issue a prefetch request resulting from the extrapolation. The prefetch pattern storage therefore enables the prefetch apparatus to identify patterns of access requests which occur and to extrapolate these in order to be able to predict expected access requests on the basis of previously received access requests and to initiate prefetching for those expected access requests.

Although the capability to use two types of prefetching algorithm may therefore be implemented, in some embodiments the request tracking storage comprises region prefetching marker storage to store for each region entry a region prefetching marker indicating whether the region prefetching process has been initiated for that region, and prefetch control circuitry is responsive to the region prefetching marker to disable access to the prefetch pattern storage. Where the region prefetching process has been initiated for a given region, it is recognised that it may not be desirable to also continue to monitor the pattern of access requests received within this region (since the initiation of the region prefetching process means that the entire region will be prefetched) and therefore an efficiency benefit can be gained by referencing the region prefetching marker to determine whether the prefetch pattern storage should be accessed. Thus, when a region is subject to the region prefetching process (and the region prefetching marker is set) then access to the prefetch pattern storage may be disabled and the energy and latency associated therewith can then be saved.

The prefetch pattern storage may be provided in a variety of ways, but in some embodiments the prefetch pattern storage comprises the request tracking storage. In other words, the request tracking storage which enables the prefetch apparatus to monitor the reception of access request addresses within regions of memory space that have been requested may be provided as part of a prefetch pattern storage. For example, where the prefetch pattern storage stores its information on the basis of access request addresses, the prefetch pattern storage may then comprise additional storage capacity in order to track the access requests in terms of the regions to which they correspond.

A variety of prefetch algorithm which may be combined with the present techniques is that of a "stride prefetcher". In some embodiments the prefetch apparatus further comprises prefetch stride storage circuitry to store a last received access request address, an access request stride length and a stride confidence value, and the prefetch control circuitry is arranged to perform a comparison between the access request stride length, the last received access request address and a current access request address and to update the stride confidence value in dependence on a result of the comparison, and to issue a prefetch request for a predicted access request corresponding to the access request stride length added to the current access request address in dependence on the stride confidence value. Accordingly, a prefetch stride algorithm may be combined with the present techniques in order to provide a prefetch apparatus which derives the benefits of each type of technique. In particular, the combination with a prefetch stride algorithm may be useful since in general a prefetch stride algorithm will recognise patterns of access request addresses which omit more than half of the access request addresses within a given portion of memory space (since the minimum stride size will cause alternate access request addresses to be prefetched). By contrast, the present techniques initiate the region prefetching process on the basis of at least a predetermined number of the access request addresses in an adjacent region of memory space having been accessed, and indeed this may correspond to a majority of the access request addresses being accessed, which will then generally be mutually exclusive with a typical pattern of access request addresses for a stride prefetcher. In consequence, an improved prefetch apparatus may be provided which combines both techniques.

As mentioned above, the access requests may be load requests, store requests, or a combination of the two. Hence: in some embodiments the access requests comprise load requests and each load request has a load request address; in some embodiments the access requests comprise store requests and each store request has a store request address; and in some embodiments the access requests comprise both load requests and store requests, wherein each load request has a load request address and each store request has a store request address. Whilst in general loads tend to be critical for performance and therefore it is evidently useful to prefetch the loads, the present techniques further recognise that there may also be instances where it is beneficial to issue prefetches for stores, since for example a store that misses in a cache can cause a backup to occur, and must then wait for the resulting cache line fill to complete before the store can be actioned.

Some particular embodiments will now be described with reference to the figures.

Figure 1:
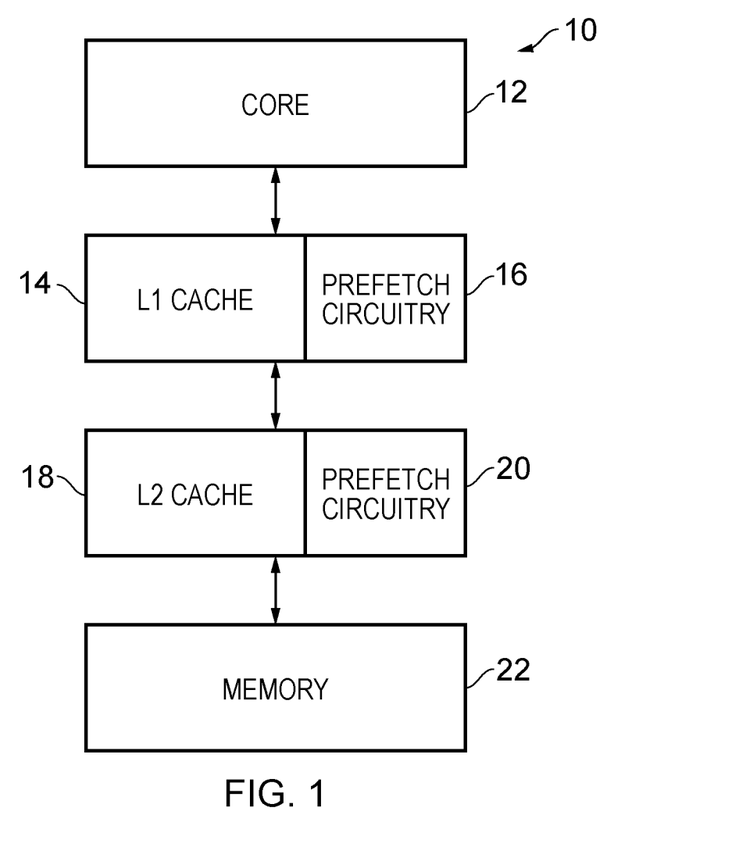
FIG. 1 schematically illustrates a data processing apparatus having a cache memory hierarchy leading to a main memory, wherein at least one cache level is provided with the prefetch circuitry of one embodiment.

FIG. 1 schematically illustrates a data processing system 10. The data processing system 10 comprises a processor core 12, a level one cache 14, a level two cache 18 and a main memory 22. Each of the caches are provided with associated prefetch circuitry, namely prefetch circuitry 16 and 20. In performing its data processing operations, the data processor core 12 requires access to data items in the memory 22, and the cache hierarchy provided by the level one cache 14 and the level two cache 18 reduces the latency associated in particular with loading these data items from memory. This is achieved on the one hand by holding copies of data items in their respective storage, such that the corresponding data item does not need to be accessed in memory 22 each time it is accessed and on the other hand by the use of their respective prefetch circuitry 16, 20 which, as will be described in more detail below, seeks to populate the relevant cache level with data items which are expected to be the subject of access requests, but for which those access requests have not in fact yet been received by that cache level. It should be understood that a "data item" here means any memory content which can be retrieved and may thus be either an instruction or data. Moreover one of ordinary skill will be aware that such caches typically do not retrieve individually addressable data items from memory, but rather sets of data items which form a cache line, and this is the case here.

Figure 2:
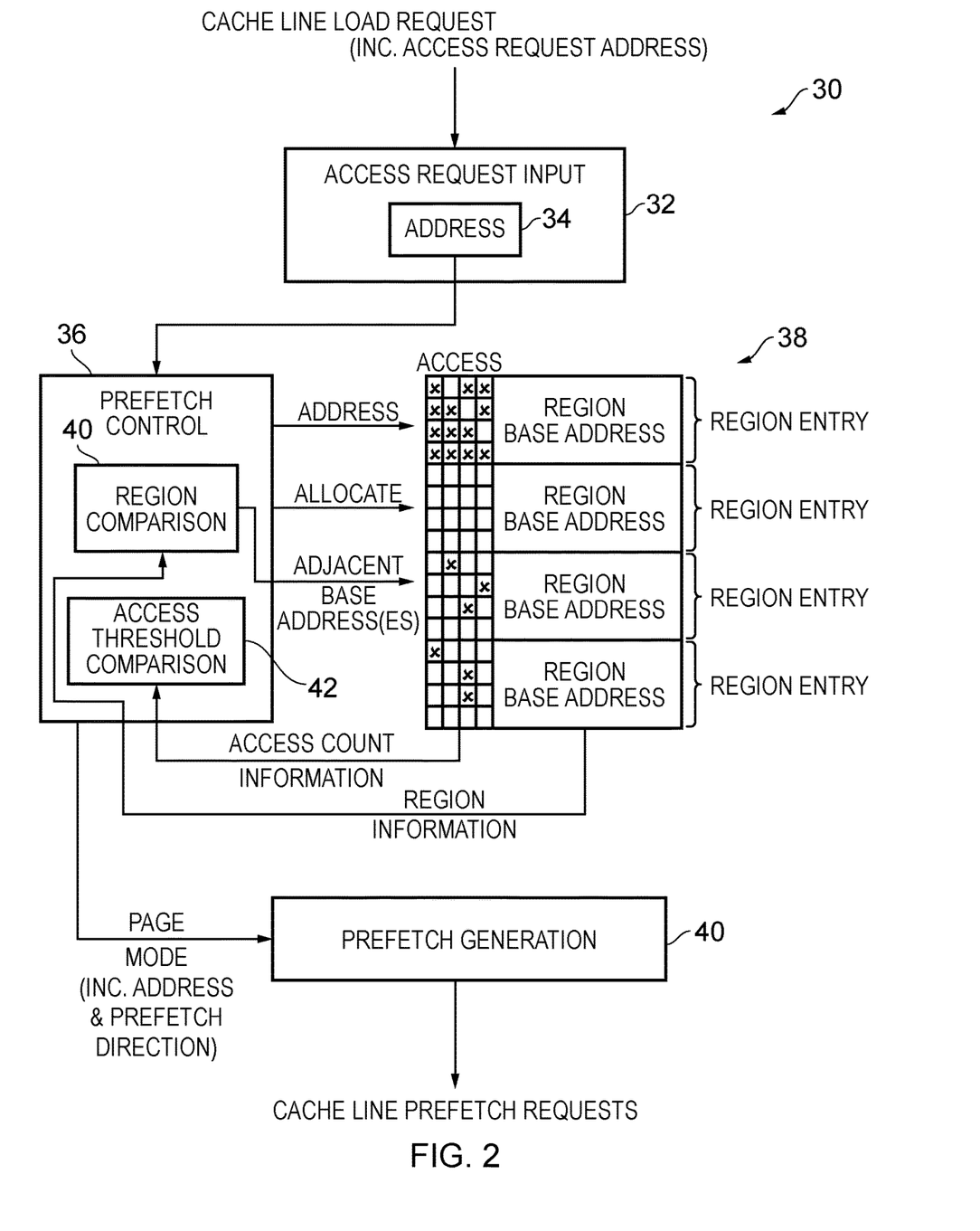
FIG. 2 schematically illustrates in more detail the structure of the prefetch circuitry which is provided by one embodiment as the prefetch circuitry in FIG. 1.

FIG. 2 schematically illustrates prefetch circuitry 30 in one embodiment. This prefetch apparatus 30 may for example be provided as the prefetch circuitry 16 in the data processing system 10 of FIG. 1. This prefetch apparatus 30 receives cache line load requests which include an access request address associated with the particular cache line being requested. Thus, where the cache storage device (such as the level one cache 14 shown in FIG. 1) receives an access request relating to a given data item from the core 12 (specified in terms of its memory address), it will initiate a cache line load request if it is determined that the required data item is not currently stored in that cache. It should be note that the access request could therefore be a load request relating to a data item which the core requires to be retrieved from the memory, but could also be a store request relating to a data item which the core requires to be written to the memory, but has missed in the cache and the cache configuration is such that a cache line fill is first carried out and then the store is made with respect to the newly filled cache line (to then later be written out to memory). In either of these cases then a cache line load request is generated which is passed further in the cache hierarchy in order to populate this cache level with the corresponding cache line. A cache line load request is received by the load request input circuitry 32 which can identify the access request address 34 therein, and pass this to prefetch control circuitry 36 of the prefetch apparatus.

The prefetch apparatus is also provided with tracking storage 38 and prefetch generation circuitry 40. Note that although the prefetch control circuitry 36 and tracking storage 38 are shown as separate components in FIG. 2, this is predominantly for clarity of illustration and the two may form a combined system component, for example where the prefetch control circuitry 36 is an extension of the control circuitry of the tracking storage 38. The request tracking storage 38 is capable of storing a number of region entries, wherein each region entry corresponds to a range of memory addresses. The correspondence between memory addresses and regions is predefined, such that on receipt of an access request address the prefetch control circuitry 36 can determine the base address of the region to which it belongs. For simplicity of illustration, the request tracking storage 38 shown in FIG. 2 only shows four region entries, but the request tracking storage is in no way constrained to only hold four region entries and the number of region entries is a system configuration parameter which may be freely set in dependence on the system requirements. On receipt of an access request address, the prefetch control circuitry 36 responds by comparing this access request address with the region information which it receives from the request tracking storage 38. This enables the prefetch control circuitry to determine if a region entry already exists in the request tracking storage corresponding to this access request address. The prefetch control circuitry 36 passes an indication of the access request address to the tracking storage 38, in which (in the embodiment shown in FIG. 2) each region entry stores access information associated with each region in the form of a marker which indicates whether a particular access request address within that region has been accessed. In the example of FIG. 2, the region entries in the request tracking storage 38 each correspond to 16 64-byte cache lines (and therefore each region corresponds to 1 kB of memory). Thus, when a cache line load request is received by the prefetch apparatus 30 in FIG. 2, where a corresponding region entry already exists for the region of memory to which this cache line load request belongs, then the request tracking storage 38 marks the corresponding access information in that region entry to show that access to this particular cache line has been carried out during the lifetime of this region entry within the request tracking storage.

However, when the prefetch control circuitry 36 determines that no region entry currently exists within the request tracking storage 38 for the cache line load request which it has received, then a new region entry is allocated into the request tracking storage. This allocation of a new entry into this storage is carried out in a cache-like manner, wherein an existing region entry is evicted based on predetermined eviction criteria. Further, when the prefetch control circuitry 36 causes a new region entry to be allocated into the request tracking storage 38, the prefetch control circuitry 36 also examines other region entries within the request tracking storage to determine if there is an adjacent region entry (adjacent in terms of the memory space to which the region belongs), i.e. such that the adjacent region and the region for which the new entry has just been allocated form a contiguous portion of memory space. The region comparison circuitry 40 does this by generating the relevant adjacent base addresses (or at least a sufficient portion thereof to be unique within the tracking storage), which are passed to the tracking storage 38 for comparison with the region entries stored. When such an adjacent entry is present in the request tracking storage, the prefetch control circuitry 36 further determines if the access information stored in association with that adjacent region entry indicates that at least a predetermined number of the cache lines which belong to that region have been accessed. In the example of FIG. 2, where each region corresponds to 16 cache lines, this threshold may for example be defined to be 13, i.e. if 13 or more cache lines within this region are accessed, then the prefetch control circuitry 36 determines that this criterion has been met. The comparison between the access count information and the predetermined threshold is carried out by the access threshold comparison circuitry 42. Moreover, the prefetch control circuitry 36 can also determine (using its region comparison circuitry 40) whether the adjacent region is above or below the new region (just allocated) in the request tracking storage. The prefetch control circuitry 36 signals to the prefetch generation circuitry 40 (in the event that an adjacent region entry has been found for which the access count information indicates that the threshold has been crossed) for the prefetch generation circuitry to begin "page mode" prefetching for the memory region corresponding to the new region entry. The prefetch control circuitry 36 indicates the region base address and a prefetch direction, wherein if the adjacent region (which has been accessed more than the defined threshold) is below the new region in memory space then it is assumed that memory addresses are being accessed in an incrementing fashion and the prefetch direction signalled to the prefetch generation circuitry 40 is correspondingly indicated as increasing. Conversely, if the adjacent region is above the new region in memory space then it is assumed that the memory addresses are being accessed in a decrementing fashion, and the prefetch direction indicated by the prefetch control circuitry 36 to the prefetch generation circuitry 40 is decreasing. The prefetch generation circuitry 40 then begins generating cache line prefetch requests corresponding to the new region, either incrementing or decrementing through the region as appropriate. If the cache level at which the prefetch circuitry 30 is targeting the prefetch has sufficient storage capacity, these cache line prefetch requests for the new region may be generated as a group, and are then actioned as soon as possible within the system. However if the cache level at which the prefetch circuitry 30 is targeting the prefetch has a limited storage capacity, generation of these cache line prefetch requests for the new region may be staggered, so that at first only a subset (or even a just a single cache line prefetch request) is generated and the further cache line prefetch requests for the new region are generated after a delay, so that the storage capacity of the cache level is not swamped by the return of the full set of cache lines in response to the full set of cache line prefetch requests for the new region.

Figure 3:
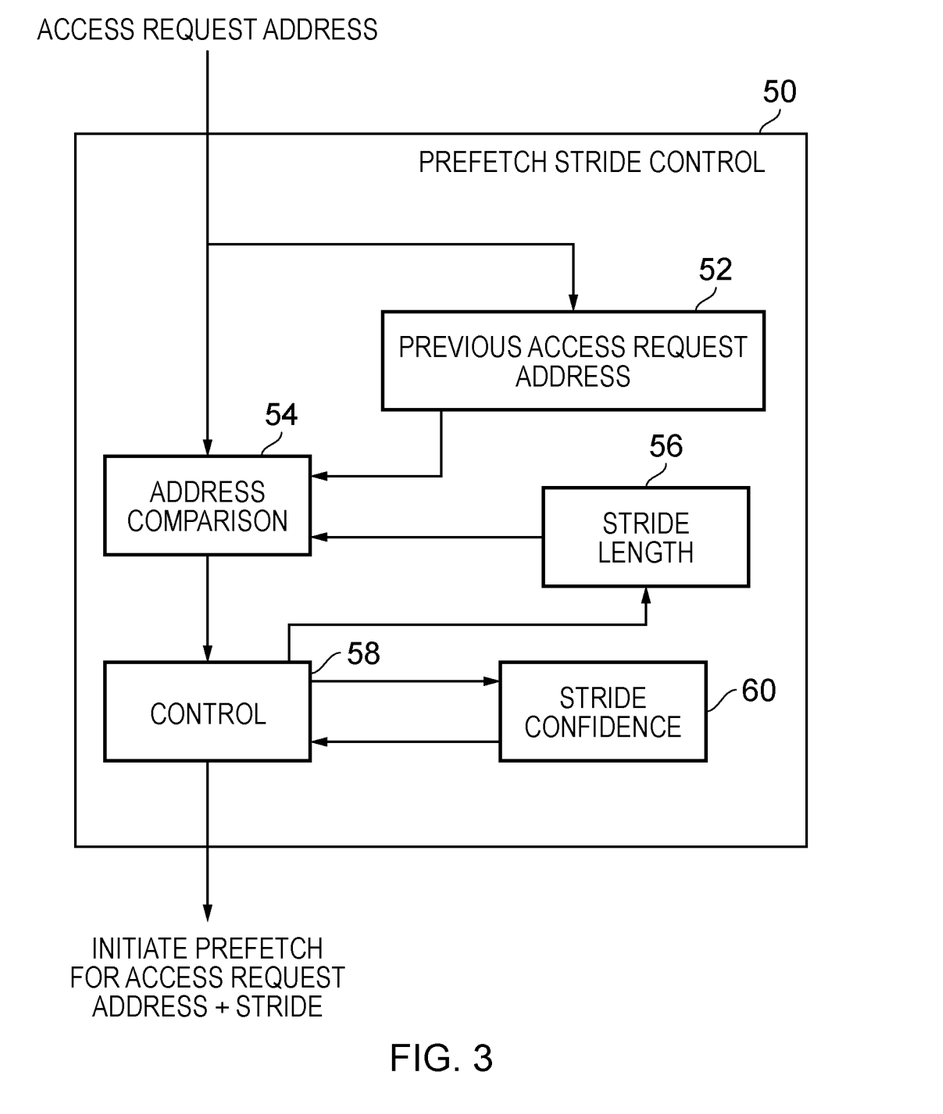
FIG. 3 schematically illustrates prefetch stride control circuitry within prefetch circuitry in one embodiment.

FIG. 3 schematically illustrates an additional component of prefetch apparatus in one embodiment, namely prefetch stride control 50. The prefetch stride control 50 comprises address comparison circuitry 54 and control circuitry 58, which are arranged to monitor access request addresses received by the prefetch stride control 50 and to determine if these correspond to a pattern of access request addresses which is defined by a given stride length. These access request addresses may related to load requests, store requests or combination of both which are received by the cache. To support this the prefetch stride control circuitry 50 is provided with three storage components, namely the previous access request address storage 52, the stride length storage 56 and the stride confidence storage 60. When an access request address is received by the prefetch stride control circuitry 50, it is passed to the address comparison circuitry 54 which compares this newly received access request address against the previous access request address held in storage 52. Accordingly, each new access request address is also passed to the previous access request address storage 52, such that once this comparison has been made it may replace the content of storage 52. The comparison performed by the address comparison 54 further involves the stride length held by the stride length storage 56, in particular such that the stride length value held by the stride length storage 56 can either be added to the previous access request address and the address comparison circuitry 54 determines if this matches the newly received access request address, or the difference between the previous access request address and the newly received access request address can be computed and this value compared with the stride length held by the stride length storage 56. The result of this comparison is signalled to the control circuitry 58. The control circuitry 58 makes use of the stride confidence storage 56 to involve a degree of hysteresis in the address comparison process, namely that it is not necessarily for the new received access request address to always match the previous access request address plus the stride length (or alternatively for the computed address difference to match the stored stride length) in order for the control circuitry 58 to determine that a prefetch should be initiated. The control circuitry 58 can increase the stride confidence value stored by the stride confidence storage 60 when a match is found by the address comparison circuitry 54, and can decrease the stride confidence when an address match is not found by the address comparison circuitry 54. The decision about whether to initiate prefetch by the control circuitry 58 is made with reference to the stride confidence value 60, such that over a period of time as long as the majority, say, of the comparisons indicate an increasing or decreasing pattern of access request address corresponding to the stride length, then prefetches are initiated. The control circuitry 58 is configured to signal to prefetch generation circuitry that prefetch requests should be initiated for the access request address plus the stride length, namely in the expectation that the next access request address to be received will be that of the current access request address incremented by the stride length (noting that this could be positive or negative).

Figure 4:
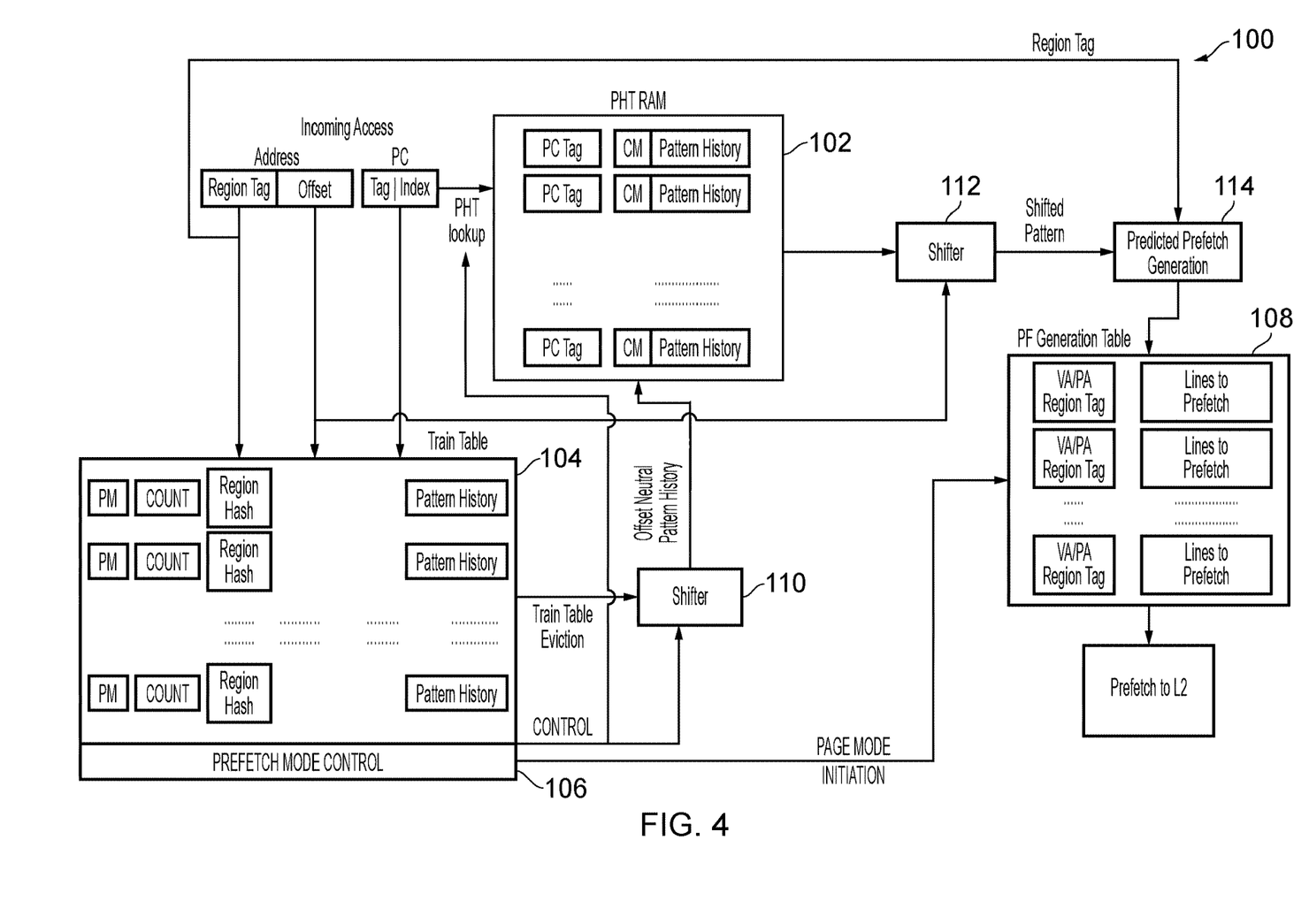
FIG. 4 schematically illustrates prefetch circuitry in one embodiment.

FIG. 4 schematically illustrates prefetch apparatus 100 in one embodiment. The main components of the prefetch apparatus 100 shown in FIG. 4 are the pattern history table (PHT) 102, the train table 104 and the associated prefetch mode control circuitry 106, and the prefetch (PF) generation table 108. An incoming access address is received by the train table 104, which is used to record the incoming access patterns. In this example, where the prefetch apparatus 100 is associated with a level one cache (for example in the manner of the prefetch circuitry 16 shown in FIG. 1) the patterns are recorded in regions of 1 kB granularity, using a bit vector for each cache line in the region. In other words, as access requests are received, the access request is mapped into a region (indicated by the region hash in train table 104) and the corresponding pattern history bit vector is updated to indicate the particular cache line within this region which has been accessed. The pattern history table 102 is used to accumulate observed patterns and develop confidence measures (CM) over time as operation of the data processing system continues. An overflow in the train table 104 (i.e. when an entry therein is evicted) causes an update to the PHT 102. This is handled by the shifter circuitry 110, which causes the pattern to be stored in an offset neutral manner by shifting it based on the offset of the evicted entry. If the entry being evicted from the train table 104 already exists in the PHT 102 then it is combined with the prior information stored therein to adjust a confidence measure associated with that existing entry. Similarly, during normal operation incoming accesses also look up in this table ("PHT lookup") in order to find patterns of high confidence that may then be used to initiate prefetching. This prefetching is handled by the shifter 112 and the predicted prefetch generation 114, which creates entries in the prefetch (PF) generation table 108, indicating the cache lines which should be prefetched and these are then forwarded to level 2. The generation table 108 also uses 1 kB region based entries and uses a bit vector to identify the lines which should be prefetched.

The train table 104 also holds a page mode (PM) marker and a count value for each region entry (identified by the corresponding region hash). As described above, when an incoming access request causes a new region entry to be allocated into the train table (since this is the request tracking storage in this example) the train table 104 is examined to determine if there is a match for a neighbouring entry and, if one does exist, the count value of that neighbouring entry is checked to see if it exceeds the predetermined threshold. Administration of this process is carried out by the prefetch mode control 106. If the access count of the neighbouring region entry does exceed the threshold then the new entry in the train table is marked as being allocated in page mode (the marker PM is set) and prefetches are then generated directly by the prefetch mode control 106 in page mode into the prefetch generation table 108. Furthermore, the prefetch mode control 106 then suppresses access to the PHT RAM 102, such that the PHT 102 is bypassed on both lookups and evictions of train table entries that have been tagged as being in page mode. The examination of the train table 104 to determine if a neighbouring entry exists by the prefetch mode control 106 is simplified by an examination of the offset of the incoming address and if its offset is in the lower half of the region then an incrementing usage of memory addresses is assumed (or decrementing if in the upper half of the region). Thus only one comparison value address is generated by the prefetch mode control (above or below the current incoming access address as appropriate) for comparison with the existing train table entries. Also, where the prefetch apparatus of FIG. 4 is to be found is an L1 cache, which therefore has a relatively limited storage capacity, the prefetches generated for the page mode in the prefetch generation table 108 are not actioned as a group, but in subsets, so that the pace of retrieval of the requested cache lines does not exceed the cache's capacity to store those lines until they are needed. In a cache further towards the memory this constraint may be less significant and prefetches for the group may be actioned together.

Figure 5:
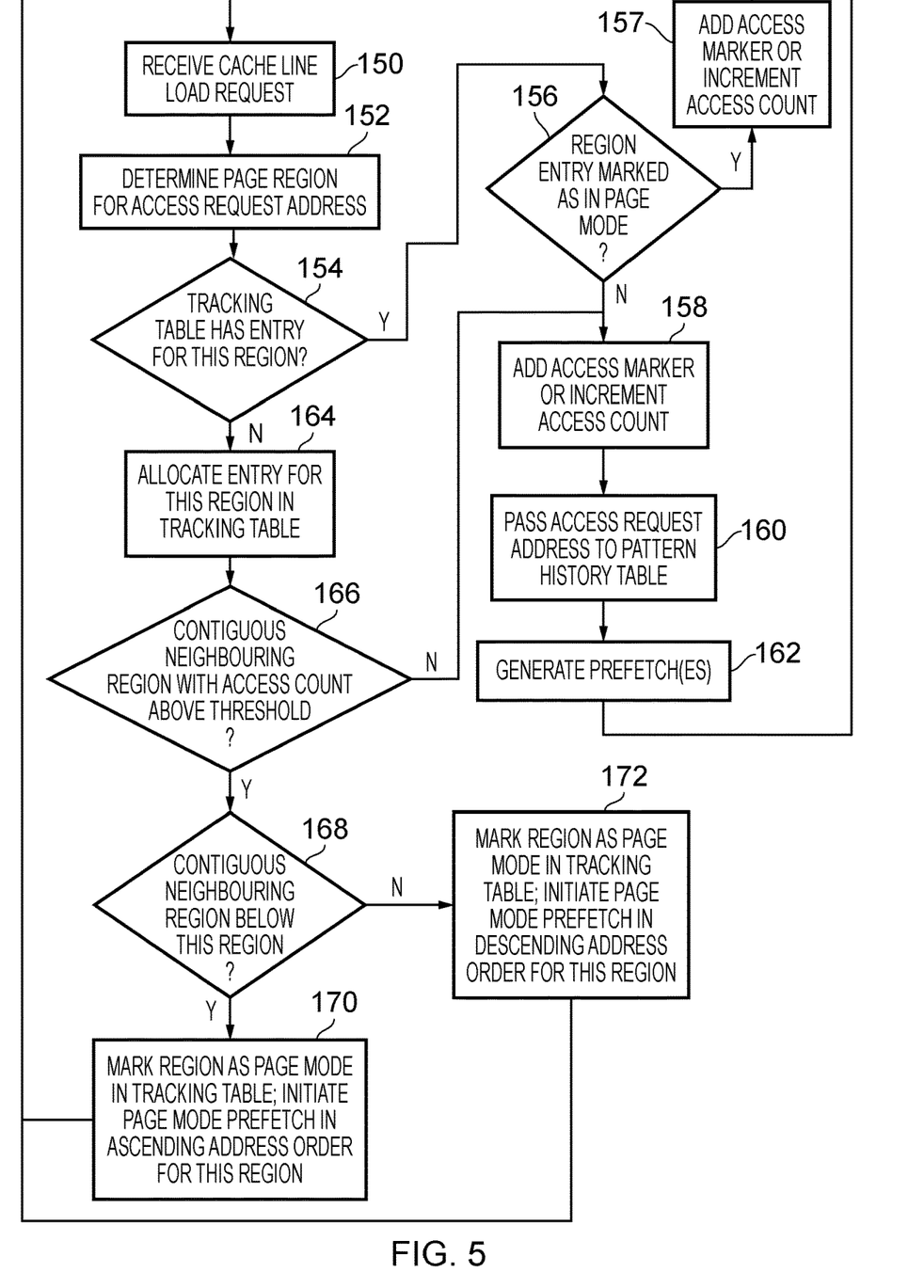
FIG. 5 shows a sequence of steps which are taken in the operation of prefetch circuitry in one embodiment.

FIG. 5 shows a sequence of steps which are carried out when the method of one embodiment is performed with respect to the prefetch apparatus 100 of FIG. 4. The flow of the method steps shown in FIG. 5 can be considered to begin at step 150 where a new cache line load request is received. As mentioned above this may have been triggered by the cache receiving a memory access request which is either a load request or a store request. Then at step 152 it is determined what the corresponding page region is for a load request address associated with the access request and at step 154 it is determined if the tracking table (train table 104) already has an entry for this identified region. If it does then the flow proceeds to step 156 where it is determined if that region entry is already marked as being in page mode. If it is marked as being in page mode then the flow proceeds to step 157 where the access information for this region entry is updated (either adding an access marker or incrementing an access count) and then the flow returns to step 150 for a new cache line load request to be received, since the cache line load request under consideration is already being serviced by the page mode previously initiated for this region. If however at step 156 it is determined that the region is not marked as being in page mode then the access information for this region entry is updated to indicate the access to this cache line, in that a counter associated with this region is incremented. Then at step 160 the access request address is passed to the pattern history table and at step 162 prefetches are generated as appropriate on the basis of predictions based on the content of the pattern history table. Thereafter, the flow returns to step 150.

If however it is determined at step 154 that the tracking table (i.e. the train table 104) does not currently have an entry corresponding to the region associated with the access request address of this cache line load request, then the flow proceeds to step 164 where a new region entry is allocated into the train (tracking) table. Then at step 166 it is determined if a contiguous neighbouring region has an entry in the train table which has an access count above the predetermined threshold. If it does not, then the flow proceeds to step 158 where the access count for the new region entry is incremented and so on via steps 160 and 162 (as described above). If however there is a contiguous neighbouring region with an access count above the threshold, then the flow proceeds to step 168 where it is determined whether this contiguous neighbouring region is below the new region in memory space. If it is, then the flow proceeds to step 170 where the new region is marked as being in page mode in the tracking table and page mode prefetch is initiated for this region in ascending order of access request addresses. Conversely, if at step 168 it is determined that the contiguous neighbouring region is above the new region (in memory space) then the flow proceeds to step 172 where the new region is marked as being in page mode and the page mode prefetch initiated for this region is for a descending order of access request addresses. From either step 170 or 172 the flow returns to step 150.

In brief overall summary, prefetch apparatus and a method of prefetching are presented. The prefetch apparatus monitors access requests, each having an access request address, and has request tracking storage to store region entries for regions of memory space which each span multiple access request addresses. The request tracking storage keeps access information for access requests received in their corresponding region entries. When a new region access request is received, which belongs to a new region for which there is no region entry, and when the request tracking storage has an adjacent region entry for which the access information shows that at least a predetermined number of the access request addresses have been accessed, a page mode region prefetching process is initiated for all access request addresses in the new region.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. A prefetch apparatus comprising:
    access request reception circuitry to receive access requests, each access request having an access request address;
    request tracking storage to store a plurality of region entries, wherein each region entry corresponds to a region of memory space and corresponds to a plurality of access request addresses within that region of memory space, and wherein the request tracking storage is responsive to reception of each access request to update access information in its corresponding region entry; and
    prefetch control circuitry responsive to the access request reception circuitry receiving a new region access request which belongs to a new region for which there is no region entry, and when the request tracking storage has an adjacent region entry corresponding to an adjacent region of memory space to the new region for which the access information indicates that at least a predetermined number of the access request addresses in the adjacent region of memory space have been accessed, to initiate a region prefetching process for all access request addresses in the new region,
    wherein the access request address received by the access request reception circuitry is specified as a region tag and an offset in an offset range, and the prefetch control circuitry is responsive to the offset being in a lower half of the offset range to examine the access information in the adjacent region of memory space below the access request address and is responsive to the offset being in a upper half of the offset range to examine the access information in the adjacent region of memory space above the access request address.

2. The prefetch apparatus as claimed in claim 1, wherein the request tracking storage is responsive to reception of the new region access request which belongs to the new region for which there is no region entry to create a new region entry for the new region.

3. The prefetch apparatus as claimed in claim 1, wherein the access information in each region entry comprises a plurality of access indications corresponding to the plurality of access requests whose access request addresses are within that region of memory space, and wherein the request tracking storage is responsive to reception of each access request to set an access indication corresponding to the access request address of that access request.

4. The prefetch apparatus as claimed in claim 1, wherein the plurality of region entries each comprise a counter and the access information in each region entry comprises a count value of the counter.

5. The prefetch apparatus as claimed in claim 1, wherein the prefetch control circuitry is responsive to the adjacent region of memory space being below the new region to cause the region prefetching process to prefetch the access request addresses in the new region in ascending order.

6. The prefetch apparatus as claimed in claim 1, wherein the prefetch control circuitry is responsive to the adjacent region of memory space being above the new region to cause the region prefetching process to prefetch the access request addresses in the new region in descending order.

7. The prefetch apparatus as claimed in claim 1, wherein the access requests are cache line requests and each region entry corresponds to a plurality of cache line requests.

8. The prefetch apparatus as claimed in claim 1, wherein the region prefetching process comprises sequentially issuing plural prefetch requests for subgroups of access request addresses in the new region.

9. The prefetch apparatus as claimed in claim 1, wherein the region prefetching process comprises issuing as a group prefetch requests for all access request addresses in the new region.

10. The prefetch apparatus as claimed in claim 1, further comprising prefetch pattern storage to store indications of previously received access requests and the prefetch control circuitry is responsive to the indications of previously received access requests in the prefetch pattern storage corresponding to a predetermined pattern of access requests to perform an extrapolation of the indications of previously received access requests in the prefetch pattern storage and issue a prefetch request resulting from the extrapolation.

11. The prefetch apparatus as claimed in claim 10, wherein the request tracking storage comprises region prefetching marker storage to store for each region entry a region prefetching marker indicating whether the region prefetching process has been initiated for that region,
and prefetch control circuitry is responsive to the region prefetching marker to disable access to the prefetch pattern storage.

12. The prefetch apparatus as claimed in claim 10, wherein the prefetch pattern storage comprises the request tracking storage.

13. The prefetch apparatus as claimed in claim 1, further comprising prefetch stride storage circuitry to store a last received access request address, an access request stride length and a stride confidence value, and
the prefetch control circuitry is arranged to perform a comparison between the access request stride length, the last received access request address and a current access request address and to update the stride confidence value in dependence on a result of the comparison,
and to issue a prefetch request for a predicted access request corresponding to the access request stride length added to the current access request address in dependence on the stride confidence value.

14. The prefetch apparatus as claimed in claim 1, wherein the access requests comprise load requests and each load request has a load request address.

15. The prefetch apparatus as claimed in claim 1, wherein the access requests comprise store requests and each store request has a store request address.

16. The prefetch apparatus as claimed in claim 1, wherein the access requests comprise both load requests and store requests, wherein each load request has a load request address and each store request has a store request address.

17. A method of issuing prefetch requests in a prefetch apparatus comprising:

receiving access requests, each access request having an access request address;
storing a plurality of region entries in request tracking storage, wherein each region entry corresponds to a region of memory space and corresponds to a plurality of access request addresses within that region of memory space;
updating access information in a corresponding region entry for each access request received; and
initiating a region prefetching process for all access request addresses in the new region in response to receiving the new region access request, when the request tracking storage has an adjacent region entry corresponding to an adjacent region of memory space to the new region for which the access information indicates that at least a predetermined number of the access request addresses in the adjacent region of memory space have been accessed, wherein
the access request address received is specified as a region tag and an offset in an offset range,
in response to the offset being in a lower half of the offset range to examine the access information in the adjacent region of memory space below the access request address, and
in response to the offset being in a upper half of the offset range to examine the access information in the adjacent region of memory space above the access request address.

18. A prefetch apparatus comprising:
means for receiving access requests, each access request having an access request address;
means for storing a plurality of region entries, wherein each region entry corresponds to a region of memory space and corresponds to a plurality of access request addresses within that region of memory space;
means for updating access information in a corresponding region entry for each access request received; and
means for initiating a region prefetching process for all access request addresses in the new region in response to receiving the new region access request, when the means for storing the plurality of region entries has an adjacent region entry corresponding to an adjacent region of memory space to the new region for which the access information indicates that at least a predetermined number of the access request addresses in the adjacent region of memory space have been accessed,
wherein the access request address received by the means for receiving access requests is specified as a region tag and an offset in an offset range, and the means for initiating is responsive to the offset being in a lower half of the offset range to examine the access information in the adjacent region of memory space below the access request address and is responsive to the offset being in a upper half of the offset range to examine the access information in the adjacent region of memory space above the access request address.

* * * * *